Aug. 24, 1965  J. B. JONES ETAL  3,201,864
METHOD AND APPARATUS FOR ULTRASONIC WELDING
Filed Nov. 25, 1960  3 Sheets-Sheet 1
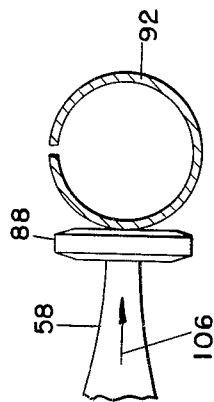
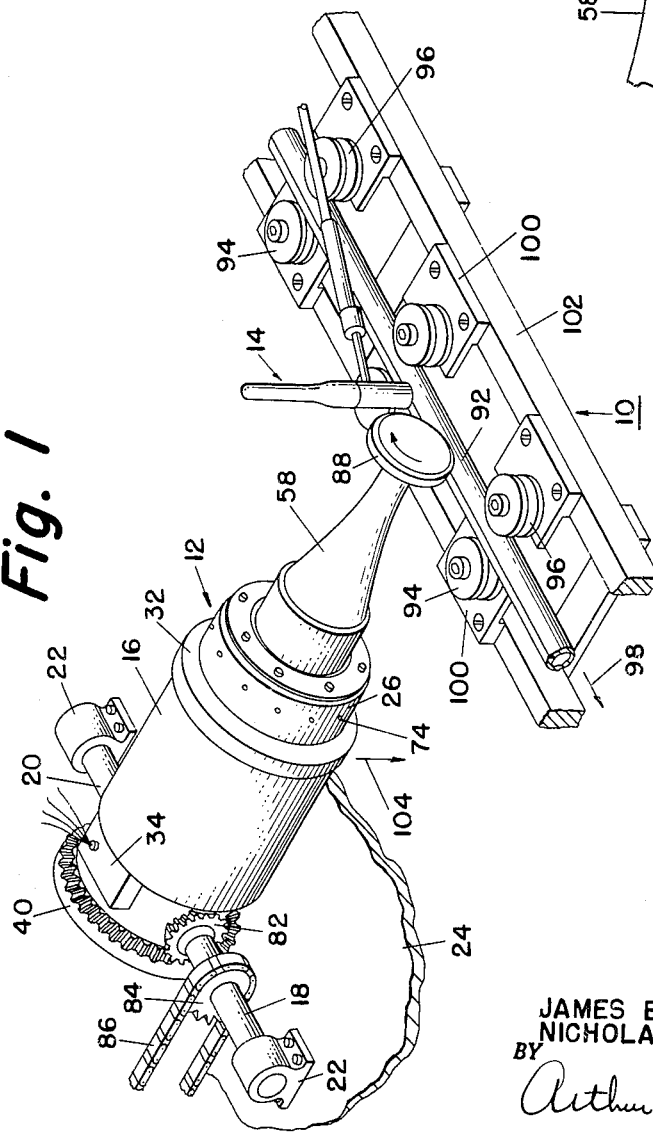
INVENTORS
JAMES BYRON JONES
NICHOLAS MAROPIS
BY
Arthur H. Seidel
ATTORNEY

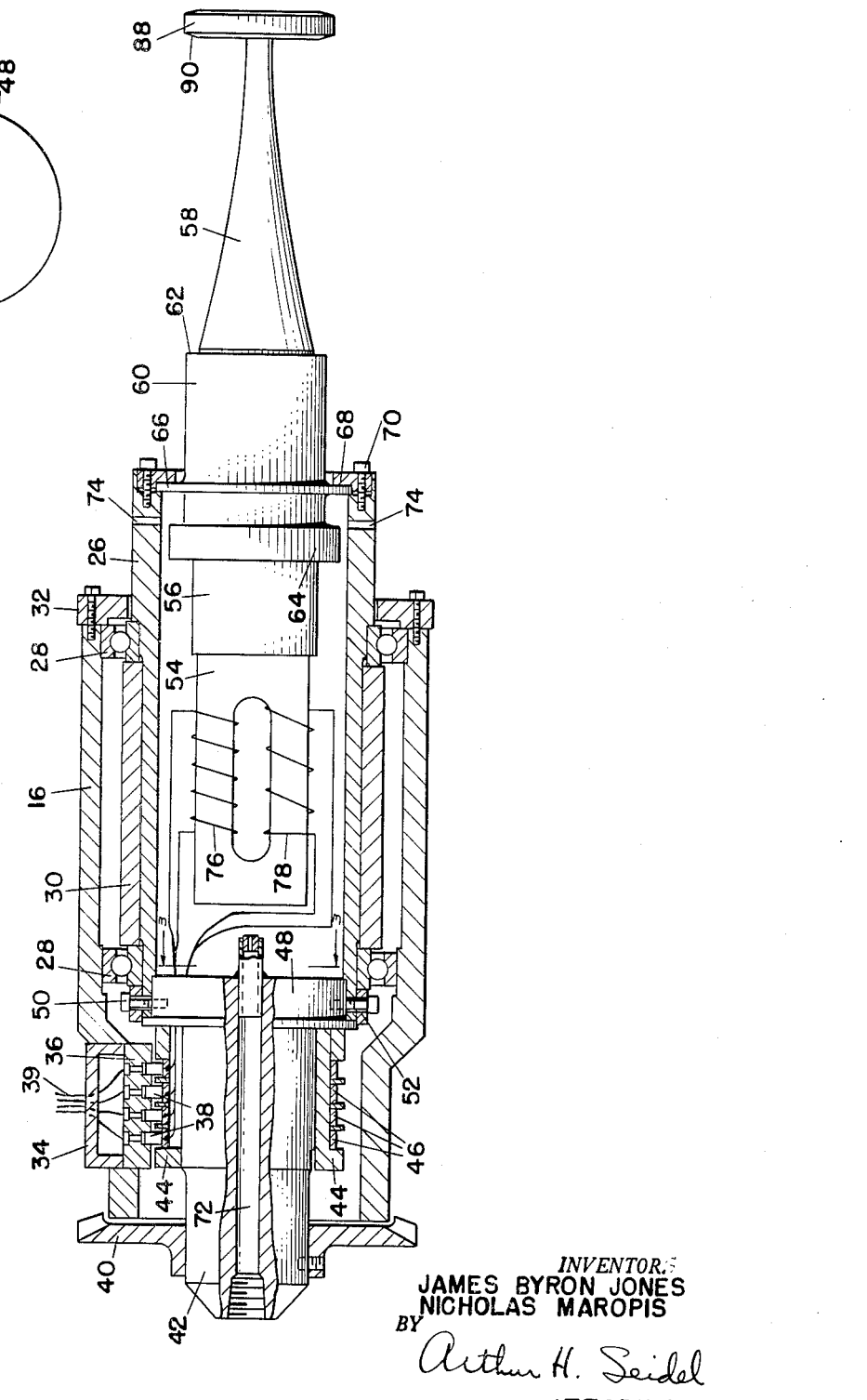

Aug. 24, 1965  J. B. JONES ETAL  3,201,864
METHOD AND APPARATUS FOR ULTRASONIC WELDING
Filed Nov. 25, 1960  3 Sheets-Sheet 3

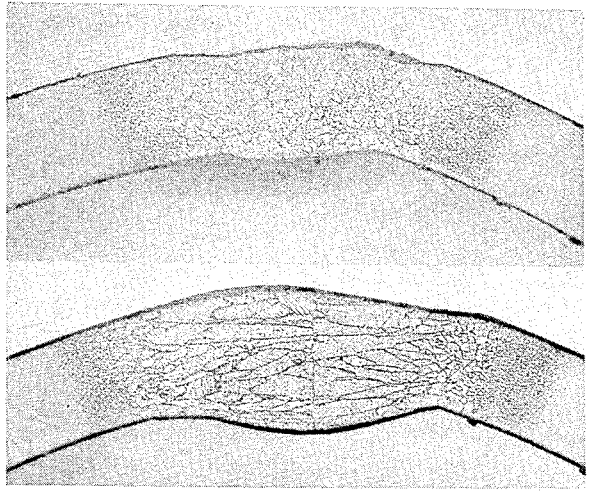

ULTRASONIC

NON-ULTRASONIC

FIG.5
GRAIN REFINEMENT ACHIEVED BY ULTRASONIC APPLICATION
TO ARC WELDING OF 430 STAINLESS STEEL TUBING

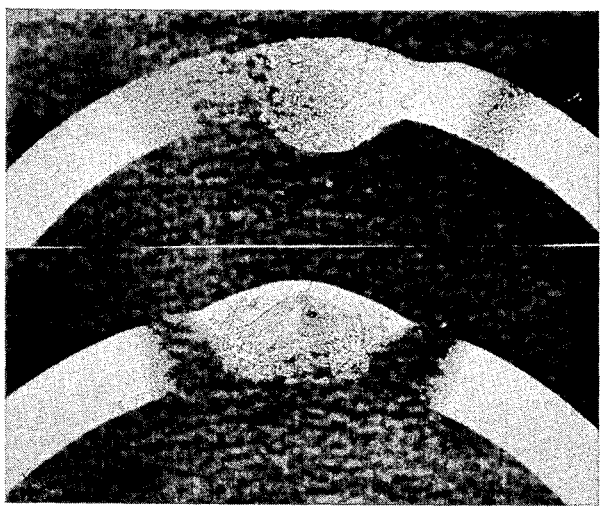

ULTRASONIC

NON-ULTRASONIC

FIG.6
GRAIN REFINEMENT ACHIEVED BY ULTRASONIC APPLICATION
TO ARC WELDING OF 4140 ALLOY STEEL TUBING

INVENTORS
JAMES BYRON JONES
NICHOLAS MAROPIS
BY Arthur H. Seidel
ATTORNEY

United States Patent Office 3,201,864
Patented Aug. 24, 1965

3,201,864
METHOD AND APPARATUS FOR ULTRASONIC WELDING
James Byron Jones and Nicholas Maropis, West Chester, Pa., assignors, by mesne assignments, to Sonobond Corporation, West Chester, Pa., a corporation of Pennsylvania
Filed Nov. 25, 1960, Ser. No. 71,776
20 Claims. (Cl. 29—487)

This invention relates to fusion welding of metals, and more particularly to fusion welding of metals wherein vibration is applied to the metals to be welded.

Reliable fusion welding techniques are needed, especially for the high-strength temperature-resistant metals and alloys desirable for use in aircraft, missile, and space structures because of their high strength/weight ratio and their heat-resistant properties. Although some success has been achieved in fusion welding some of these materials, the joints are often brittle, notch sensitive, and susceptible to cracking, and post-weld heat treatment does not always develop the desired physical properties in the weld joint. Maximum use cannot be made of these materials until welds can be provided which will withstand higher temperatures and/or loads than are now possible. Even the more common metals, such as the carbon steels, would benefit from improved welding, since structural defects occur in connection with present techniques which detract from desirable mechanical properties in the weld metal, such as a coarse-grained dendritic structure; segregation; inclusion of oxides, nitrides, and slag; porosity; fisheyes or halos; and microcracks. Some of these can be eliminated by a suitable choice of welding process, materials, and technique, but the coarse structure and segregation are not so readily eliminated.

Grain refinement during solidification and agglomeration and elimination of dissolved gases are of particular interest in connection with gas and arc welding, especially of the high-strength metals and alloys. Because of the thermal gradient in the base metal during welding, the fusion zone ordinarily consists of undesirable large columnar grains extending from the edges to the center of the weld. Also, dissolved gases may result in a porous weld bead. Both the directionality and porosity of the cast grains have an adverse effect on mechanical properties and possibly also on corrosion resistance in aggressive environments.

It has been repeatedly demonstrated in the laboratory that the application of vibration to metal melts during cooling and solidification produces refined grain structure. Successful results have been achieved with all types of metals, including aluminum, copper, iron, magnesium, cadmium, tin, bismuth, and many alloys of these metals. Other favorable effects of vibration have also been achieved with respect to metal melts, including decreased porosity due to the agglomeration and elimination of occluded gases; elimination of oxides, slags, and various other inclusions; acceleration of solution of alloying constituents in the parent metal; finer particle size and more uniform dispersion and distribution of insoluble constituents throughout the melt, etc.

Although the scientific advantages of such vibratory treatment have been demonstrated and recognized, application of vibration to various melting and casting processes has not been accepted in production usage, primarily because of the difficulties of transmitting considerable amounts of vibratory energy into production-size melts or castings. For example, vibratory energy has been found to attenuate rapidly in the transition zone between liquid and solid metal, so that only the liquid in the immediate vicinity of the transition zone receives the benefit of this type of treatment.

This problem apparently does not exist in connection with fusion welding, where only a small quantity of metal is molten at one time. Therefore, various attempts have been made to apply vibrations of ultrasonic and audible frequencies to electrical resistance welding and to gas and arc welding.

However, while the situations in casting and fusion welding are similar, they are not completely analogous and problems still exist in applying vibratory energy to fusion welding. Thus, conditions in a metal melt and in a weld nugget are basically different because, while the material in the mold is entirely liquid, only the center of the weld nugget being formed is liquid and is surrounded by material in various solidification stages. Also, the time available for vibratory influence on welding is much shorter than it is in connection with casting, and the material in the mold is usually under only atmospheric pressure, whereas the weld area, in connection with resistance welding, at least, is under electrode tip pressure which can be very considerable. Moreover, in IGR–TN/S–439, "Some experiences on the joining of the refractory metals,' by A. F. Taylor and J. F. Stockdale (United Kingdom Atomic Energy Authority, Industrial Group Headquarters, Risley, Warrington, Lancashire, 1959), it was said:

"There are many difficulties to be overcome in the application of ultrasonics to welding and considerable development work will be required. As it is not possible to introduce the oscillation through the electrode when argon-arc welding, the workpiece itself must be directly vibrated. The mode of attaching the probe to the workpiece must be such that power losses through the joint are small. Also, the joint must be held so that the vibrations will neither be damped nor yet open up a gap at the joint. Additionally, the frequency and intensity of oscillation must be chosen to give the desired result without disrupting the weld pool or fracturing the weld."

Attempts have been made in connection with resistance and gas and arc welding to transmit vibrations to the metal members being welded. These attempts may be broadly classified into three categories. The first category involves the application of vibrations to a magnetic mold or jig fitting closely around the butted ends of rods as shown in British Patent 636,680 which was published on May 3, 1950. Another category involves the application of vibrations to the welding arc as shown in Austrian patent 171,780 which was published on July 10, 1952. Another category is the application of vibrations to the metal member undergoing welding as shown in German patent 816,779 which was published on October 11, 1951.

Most of the work done heretofore has been hypothesized or has been of a limited laboratory nature involving very low frequencies in the range of 5 to 80 cycles per second, with amplitudes in the range of 0.05 to 2.5 millimeters.

We have found that vibration, particularly ultrasonic vibration, can be introduced into the metal members undergoing welding with practical and simple equipment. In particular, we provide a vibrating roller in contact with one of the metal members to be welded in close proximity to the weld zone, but not close enough so as to be damaged or affected by the heat associated with the fusion welding of the metal members. The system functions effectively if the arc or the gas torch is several inches from the vibrating roller device. The spacing will be more fully described hereinafter. The present invention provides for fusion welding under automated conditions wherein vibrations from the roller device are conducted by one of the metal members being welded to the "freezing" melt puddle produced by the fusion welding device.

We have found that the apparatus of the present invention provides refined grain structure. Also, the heat-affected zone is smaller so that the welding current necessary to generate a weld is reduced over that associated with conventional gas or arc welding. By means of the present invention, high quality welds can be accomplished in metals which are thinner than is possible with conventional fusion welding apparatus since in conventional fusion welding of thin metals, the current cannot be lessened and still provide an arc or the gas flame cannot be made small enough.

The distance between the melt puddle and the roller device inducing vibrations into one of the metal members varies with the frequency and the properties of sound absorption and transmission for said metal member. In any particular metal member, the distance between the roller device and the melt puddle will be even number multiples of one-quarter wavelengths of the acoustical energy being conducted by said one metal member.

It as an object of the present invention to provide novel, practical, and convenient apparatus for introducing the vibratory energy into a melt puddle without the deleterious effects of coupler erosion, complex torches, unwieldly hardware, etc.

It is another object of the present invention to provide a novel apparatus for use in the high-speed continuous fusion welding of such products as tubing, plates, etc.

It is still another object of the present invention to provide a combined vibratory and fusion welding apparatus wherein the metal members being welded have relative movement with respect to said apparatus.

It is another object of this invention to provide a novel method and apparatus for producing fine, equiaxed grain structure in weld metal.

It is a further object of this invention to provide a method for improving the physical properties of weld joints in metals and especially refractory metals having a high strength and hardness but low ductility.

It is a further object of this invention to provide a novel apparatus and method for fusion welding metal members which minimizes cracking tendencies in the weld metal and the adjacent base metal.

It is a still further object of this invention to provide an apparatus and method which improves the response of the weld joint to heat treatment after fusion welding.

It is yet another object of this invention to provide a novel method and apparatus for obtaining reliable and reproducible weld joints.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a partial perspective view of the apparatus of the present invention arranged particularly for fusion welding the juxtaposed edges of a metal member so as to form a pipe.

FIGURE 2 is a longitudinal sectional view of the ultrasonic device of the apparatus shown in FIGURE 1.

FIGURE 3 is an elevational view taken along the lines 3—3 in FIGURE 1.

FIGURE 4 is a partial elevational view of another embodiment of the present invention.

FIGURE 5 is a photomicrograph showing a comparison of weld grain structure obtained with and without the application of ultrasonic energy to the weld puddle in accordance with the present invention.

FIGURE 6 is a photomicrograph showing a comparison of weld grain structure obtained with and without the application of ultrasonic energy to the melt puddle with the apparatus of the present invention.

Referring to the drawing in detail, wherein like numerals indicate like elements, there is shown in FIGURE 1 an apparatus for fusion welding designated generally as 10.

The apparatus 10 comprises an ultrasonic device 12 and a conventional fusion welding device designated generally as 14.

The ultrasonic device 12 comprises an outer housing 16. The housing 16 is a hollow tubular member circular in transverse cross-section. The housing 16 is provided with a pair of oppositely directed trunnions 18 and 20. The ends of the trunnions 18 and 20, remote from the housing 16, are rotatably mounted in bearing blocks 22. The bearing blocks 22 are fixedly secured to a fixed surface 24.

An inner housing 26 is disposed within the outer housing 16 and spaced radially inwardly therefrom. Ball bearings and races 28 are disposed intermediate the outer periphery of the inner housing 26 and the inner periphery of the outer housing 16 as shown more clearly in FIGURE 2. A spacer sleeve 30 surrounds the inner housing 26 and extends between the ball bearing and races 28.

The inner housing 26 projects outwardly from the outer housing 16 as shown more clearly in FIGURE 2. A face plate 32 is fixedly secured on the end of the outer housing 16 surrounding that portion of the inner housing 26 which projects beyond the outer housing 16.

A brush cover 34 and a brush holder 36 are disposed within an aperture in the reduced diameter portion of the outer housing 16 as shown more clearly in FIGURE 2. The brush holder 36 is provided with a plurality of brushes 38. Four such brushes are shown in FIGURE 2. A plurality of wires 39 extend from the brushes 38 through a hole in the brush cover 34. The purpose of the brushes 38 and the wires 39 will be made clear hereinafter.

A beveled gear 40 is fixedly secured to the end cap 42 in any convenient manner. A slip ring sleeve 44 is fixedly secured to the outer periphery of the end cap 42. The slip ring sleeve 44 is provided with a plurality of slip rings 46, with each slip ring 46 being in contact with one of the brushes 38. Preferably, two brushes are used with each slip ring to reduce arcing tendencies. The end cap 42 is provided with an annular flange 48. A retainer means such as bolt 50 extends through a locking ring 52 and fixedly secures one end of the inner housing 26 to the periphery of the annular flange 48 as shown more clearly in FIGURE 2.

A vibration-generating means 54 is disposed within the inner housing 26. The vibration-generating means 54 may comprise any one of a wide variety of transducers known to those skilled in the art. A preferred embodiment comprises a magnetostrictive metal, such as nickel, properly dimensioned to insure axial resonance with the frequency of the alternating current applied thereto so as to cause it to decrease or increase in length according to its coefficient of magnetostriction. In place of nickel, the magnetostrictive metal may comprise the alloy 2–V Permendur (an iron-cobalt alloy), nickel-iron alloy, Alfenol (an aluminum-iron alloy), etc.

In place of the aforesaid metallic magnetostrictive materials, the transducer may comprise almost any material which has good physical properties and which changes its physical dimensions under the influence of an electric potential. Thus, it may comprise a piezoelectric ceramic, suc as barium titanate, lead zirconate, or a natural piezoelectric material, such as quartz crystals.

A coupler 56 is axially joined to the transducer of the vibration-generating means 54. The coupler 56 may comprise a solid metallic bar having a tapered end portion 58. The taper of the tapered end portions 58 is an exponential function of the length and satisfies the equation:

$$S = S_0 e^{-2Tl}$$

where $S_0$ is the reduced area, $S$ is the original area, $T$ is a constant for the taper, and $l$ is the length of the tapered section. This equation is set forth on page 163, Pieroelectric Crystals and Ultrasonics, by Warren P. Mason, published in 1950 by Van Nostrand Company, and the design of the tapered coupling member is discussed therein, including a drawing thereof which Mason designates as a "metal horn" for obtaining a large strain in a metal sample.

The total length of the coupling member should be an integral number of half-wavelengths of the transducer's frequency so that the joint between the transducer and the coupling member will come at a loop of the wave motion and will not be appreciably strained.

The coupler 56 is provided with a force-insensitive mount 60. The mount 60 comprises a sleeve which surrounds the coupler 56. A flange at end 62 of the sleeve 60 is metallurgically joined to the coupler 56. The end 64 of the sleeve is free from attachment. The sleeve is provided with a radially extending flange 66. The flange 66 is fixedly secured to the end of the inner housing 26 by a clamping ring 68 and fasteners such as bolts 70.

The sleeve of the force-insensitive mount 60 is made of steel which is resonant according to its geometry. The sleeve has a length of one-half wavelength according to the metal used at the applied frequency, or a length equal to a unit number of one-half wavelengths. The flange 66 extends radially outwardly from the sleeve midway between the ends 62 and 64 of the sleeve. Since the end 64 of the sleeve is free from any attachment, a true node will develop in the sleeve at the flange 66. Thus, substantially no vibratory energy will be transmitted to the inner housing 26. Since the force-insensitive mount 60 is well known in the art, additional description thereof is not deemed necessary.

The end cap 42 is provided with an axial passage 72 for transmitting coolant air to the vibration generating means 54. The inner housing 26 is provided with a plurality of holes 74 so that the coolant air may escape to the atmosphere. The transducer of the vibration generating means 54 is provided with a hole through which extends the wires 76 of the excitation coil and wires 78 of the polarizing coil. The wires 76 and 78 extend through the plurality of peripherally disposed holes 77 on the annular flange 48. The wires 76 and 78 are each connected to a separate one of the slip rings 46.

A pinion 82 is fixedly secured to the trunnion 18 and meshingly engaged with the teeth on the beveled gear 40. A sprocket 84 is fixedly secured to the trunnion 18 and meshingly engaged with a drive chain 86.

The free end of the taper portion 58 of the coupler 56 is metallurgically joined to the center of a resonant disc 88. The disc 88 is externally sculptured as shown by the beveled surfaces 90. The details of the dimensioning of the resonant disc 88 need not be described in detail for the purposes of the present invention. However, the details of the dimensioning of the resonant disc 88 are described more fully in our copending application Serial No. 747,254 which was filed on July 8, 1958 and entitled: Vibratory Device, now Patent No. 3,017,792.

As shown more clearly in FIGURE 1, the periphery of the resonant disc 88 is in contact with the peripheral surface of a metal member or plate arcuately formed with juxtaposed edges adapted to be bonded by a fusion weld so as to form a pipe. The arcuately formed member 92 is translated by means of the rollers 94 having curved notches 96 on their periphery. The rollers 94 are rotated by a drive means (not shown) so that the metal member 92 moves in the direction of arrow 98. The rollers 94 are rotatably mounted on plates 100 and are so adjusted so as to assure proper alignment and positioning of the metal member to be welded with respect to the disc 88 and the welding device 14. The plates 100 are fixed secured to a carriage designated generally as 102.

FIGURE 4 discloses an alternative embodiment of the present invention whereby the geometrical center of one face of the resonant disc 88 is in line contact with a peripheral surface of the metal member 92. The geometrical center of said one face of the resonant disc 88 and the peripheral surface of the disc 88 are loop regions.

Since the metal member 92 is provided with an arcuate surface, and since the resonant disc 88 merely delivers vibratory energy to the metal member 92, it is possible for the metal member 92 to have a sliding engagement with the geometrical center of one face of the resonant disc 88.

The fusion welding device 14 is spaced from the resonant disc 88 so that a melt puddle is provided at a loop of the vibratory energy delivered by the resonant disc 88 and conducted by the metal member 92. The details of the fusion welding device 14 are not necessary for the present disclosure since any one of a plurality of conventional fusion welding devices may be utilized to provide a melt puddle which will be sufficient to provide a weld between the juxtaposed edges of the metal member 92 so as to provide a pipe. The present invention is not limited to the welding of juxtaposed edges of a metal member so as to form a pipe. The present invention may be utilized to join the juxtaposed edges of a pair of metal members so as to form a butt or lap weld. If such be the case, the resonant disc 88 will only deliver vibratory energy to one of the metal members. The spacing between the point at which the resonant disc 88 delivers vibratory energy to the metal member undergoing welding and the melt puddle is critical. As pointed out above, this spacing must correspond to even number multiples of one-quarter wavelength or an integral number of one-half wavelengths of the vibratory energy being conducted by the metal member undergoing welding.

Tubes of Type 430 stainless steel having a one inch diameter were partially formed by welding using conventional mill procedures. A Lincoln shielded-arc-welder power source (Type SAE 200J) was used with a welding head incorporating a shielding nozzle and non-consumable tungsten electrode. Argon gas was used as the shielding atmosphere to prevent sagging and oxidation of the fusion zone within the tube. The gas was maintained at a constant one-half inch pressure within the tube during welding.

The remainder of the tube was formed using the apparatus 10 of the present invention. Runs were made with the translational speed of the metal member being welded varied from one inch per minute to thirty inches per minute. During these runs, the frequencies were 15,000 and 50,000 cycles per second with the power source for the transducer being a 600 watt electric generator.

The coupling between the tube and the disc was accomplished as shown in FIGURE 1 wherein the resonant disc 88 rotated in the direction of the arrow thereon at a speed which matched the translational speed of the metal member 92. Runs were also made with the coupling between the tube and the disc in the manner shown in FIGURE 4 wherein the rotating disc 88 was in sliding engagement with the periphery of the metal member 92.

Transverse sections were taken from the ultrasonically activated and control portions of each tube and specimens were prepared for metallographic examination by polishing and etching in a ten percent oxalic acid solution. A positive grain-refining effect of ultrasonic application during the fusion welding process was noted, columnar grain growth was suppressed, and an equiaxed grain structure was produced as shown in FIGURE 5.

An equiaxed structure was obtained when the frequency was 50,000 cycles per second as well as 15,000 cycles per second. The method of coupling the resonant disc to the metal member being welded did not significantly affect the weld structures obtained. With the coupling member as shown in FIGURE 1, a clamping force is applied in the direction of arrow 104 so as to maintain the periphery of the resonant disc 88 in intimate contact with the metal member 92. With the coupling method shown in FIGURE 4, a clamping force in the direction of arrow 106 was applied so as to maintain the face of the resonant disc 88 in intimate line contact with the periphery of the metal member 92.

The minimal clamping force to be used constitutes a force sufficient to maintain intimate contact between the resonant disc 88 and the metal member 92. The range of operative clamping forces which may be employed may be readily ascertained by the user of the method and apparatus of the present invention.

Tests were also made on one inch diameter modified AISI 4140 steel tubes having a wall thickness of 0.080 inch. The Lincoln shielded-arc-welder power source was provided with an Airco H-8 shielded arc welding head incorporating a shielding nozzle and a non-consumable tungsten electrode. A Heliweld filler wire feeder (Model 23100002) was used to feed 0.045 inch diameter copper-coated steel wire to the fusion zone. The photomicrographs in FIGURE 6 show a comparison between the welds obtained by the conventional or non-ultrasonic equipment as compared to the welds obtain by the method and apparatus of the present invention.

During tests, it was noted that less welding current, approximately twenty percent, was required to weld with the apparatus of the present invention as compared with welding with conventional equipment.

It was particularly significant that effective ultrasonic coupling could be achieved by surface contact of the coupling system with the metal member being welded, thereby eliminating the difficulties usually associated with delivering ultrasonic energy into high-temperature environments. The results of our investigations indicated that ultrasonic energy can be applied on a practical basis to effect favorably the grain structure resulting from arc-welded and gas-welded junctions in metallic objects. The energy requirements are reasonable, and the results were obtained at equipment frequencies in the practical range of 59 to 200,000 cycles per second.

The apparatus of the present invention, while operating at various levels of frequency and power, achieved grain refinement, provided a more regular weld bead contour, provided crack-free welds, provided optimum welding parameters and geometry to achieve consistent reproducible equiaxed grain structure, and significantly reduced the welding current required to provide a fusion weld.

As used hereinafter, the coupler 56 may be referred to as a vibrating element and the resonant disc 88 may be referred to as an end portion thereof.

The present invention may be embodied in other specific forms without departing from the spirit or essential attributes thereof and, accordingly, reference should be made to the appended claims, rather than to the foregoing specification as indicating the scope of the invention.

We claim:

1. A continuous method of fusion welding metal members comprising the steps of forcibly engaging an outer face of one of the metal members adjacent to but spaced from the intended weld zone with an end portion of a vibrating element with sufficient force to couple vibratory energy into said one member, introducing mechanical vibratory energy into said one member, introducing mechanical vibratory energy having a frequency of about 59–200,000 cycles per second to said one member through said end portion of said vibrating elements while said end portion of said vibrating element engages said one member, providing relative movement in a direction between said one member and said end portion, providing relative movement in the same direction between said one member and a fusion welding apparatus, and fusion welding said metal member with said fusion welding apparatus by providing a melt puddle in said members at a loop region of the conducted vibratory energy in said one member.

2. A method in accordance with claim 1 wherein said steps of providing a relative movement includes translating said members with respect to said end portion and said fusion welding apparatus.

3. A method in accordance with claim 2 wherein said steps of providing relative movement between said one member and said end portion includes rotating said end portion at a speed which matches the speed of translation of said members.

4. A method of fusion welding metal members comprising the steps of forcibly engaging an outer face of one of the metal members adjacent to but spaced from the intended weld zone with an end portion of a vibrating element with sufficient force to couple vibratory energy into said one member, introducing mechanical vibratory energy having a frequency of about 59–200,000 cycles per second to said one member through said end portion of said vibrating element while said end portion of said vibrating element engages said one member, and fusion welding juxtaposed portions of said metal members by providing a melt puddle in said portions of said members at a loop region of the conducted vibratory energy in said one member.

5. A continuous method of fusion welding the juxtaposed edges of an arcuately formed metal member so as to form a tubular pipe comprising the steps of forcibly engaging an outer peripheral surface of said member adjacent to but spaced from the intended weld zone with an end portion of a vibrating element with sufficient force to couple vibratory energy into said member, introducing mechanical vibratory energy having a frequency of about 59–200,000 cycles per second to said member through said end portion of said vibrating element while said end portion of said vibrating element engages the peripheral surface of said member, providing relative movement of said member in one direction with respect to said end portion and a fusion welding apparatus, and fusion welding said juxtaposed edges of said metal member with said fusion welding apparatus by providing a melt puddle at a loop region of the conducted vibratory energy in said member.

6. Apparatus for fusion welding metal members comprising a vibrating element, means mounting said vibrating element for engagement between an end portion thereof and one of the metal members adjacent to but spaced from the intended weld zone with sufficient force to couple vibratory energy into said one member, vibration generating means connected axially to said vibrating element for vibrating said element at a frequency of about 59 to 200,000 cycles per second, and a fusion welding device supported adjacent said metal members and spaced from said vibrating element by a distance corresponding to a whole number multiple of a one-half wavelength of vibratory energy in said one metal member, said fusion welding device providing a melt puddle in said metal members at a loop region of the conducted vibratory energy in said one metal member.

7. Apparatus in accordance with claim 6 including means for translating said metal members relative to said fusion welding device.

8. Apparatus in accordance with claim 7 including means for rotating said vibrating element and end portion thereof at substantially the same speed as the speed of said members so that the engagement between said one member and said end portion of said vibrating element is a rolling engagement.

9. Apparatus for fusion welding the juxtaposed edges of an arcuate plate so as to form a pipe which is circular in transverse cross-section comprising a vibrating element, means mounting said vibrating element for engagement between an end portion thereof and an arcuate peripheral surface of an arcuate plate adjacent to but spaced from the intended weld zone with sufficient force to couple vibratory energy into said plate, vibration generating means connected axially to said vibrating element for vibrating said element at a frequency of about 59 to 200,000 cycles per second, a fusion welding device supported adjacent the juxtaposed edges of the arcuate plate, said device providing a melt puddle at said juxtaposed edges at a loop region of the conducted vibratory energy in said plate, and means for providing relative movement of said plate in one direction with respect to said end portion of said vibrating element and said fusion welding device, whereby said edges are joined by a seam weld.

10. Apparatus in accordance with claim 9 wherein said end portion of said vibrating element is a resonant disc, including means for rotating said vibrating element and disc so that the engagement between said disc and said plate is a rolling engagement.

11. Apparatus in accordance with claim 9 wherein said end portion of said vibrating element is a resonant disc, and said peripheral surface of said plate being in sliding line contact with the geometrical center of a face of said disc.

12. A continuous method of fusion welding metal members comprising the steps of introducing vibratory energy into one of the metal members at a point spaced from the intended weld zone by a distance corresponding to a whole number multiple of a one-half wavelength of vibratory energy in said one metal member, fusion welding said metal members by providing a melt puddle in said members at a loop region of the conducted vibratory energy in said one member, and providing relative movement between said one metal member and the fusion welding apparatus while maintaining the distance between the melt puddle and the point at which vibratory energy is introduced into said one metal member.

13. Apparatus for fusion welding metal members comprising a support for metal members to be welded, means for causing relative movement between the support and the metal members to be welded, a fusion welding device mounted adjacent the support for providing a melt puddle in the metal members to be welded, means adjacent the support for introducing vibratory energy into one of the metal members at a point spaced from the melt puddle formed by said fusion welding device by a distance corresponding to a whole number multiple of one-half wavelength of vibratory energy in said one metal member, and said melt puddle formed by the fusion welding device being at a loop region of the conducted vibratory energy in said one metal member.

14. The method of welding comprising the steps of heating two adjacent metal edges to a welding temperature while bringing said edges close enough together to permit the two to weld together, and inducing ultrasonic vibrations in at least one of said edges whereby a weld will be formed at the edges without the formation of a substantial bead.

15. The method of seam welding comprising the steps of moving two adjacent metal edges along a predetermined path of travel while bringing said edges close enough together to permit the two to weld together, heating said edges to a welding temperature, and inducing ultrasonic vibrations in at least one of said edges whereby a seam weld will be formed at the edges without the formation of a substantial bead.

16. The method of joining metal edges comprising the steps of welding said edges together while simultaneously inducing ultrasonic vibrations in at least one of said edges whereby a weld will be formed at the edges without the formation of a substantial bead.

17. The method of welding comprising the steps of heating two adjacent metal edges to a welding temperature while bringing said edges into close abutting relationship without substantially upsetting the same, and inducing ultrasonic vibrations in at least one of said edges whereby a weld will be formed at the edges without the formation of a substantial bead.

18. The method of welding comprising the steps of heating two adjacent metal edges to a welding temperature while bringing said edges into close abutting relationship without substantially upsetting the same, and inducing ultrasonic vibrations in at least one of said edges by bringing an ultrasonically vibrating member directly into intimate contact with the body of which said one edge is a part whereby a weld will be formed at the edges without the formation of a substantial bead.

19. The method of welding comprising the steps of heating two adjacent metal edges to a welding temperature while bringing said edges into close abutting relationship without substantially upsetting the same, and inducing ultrasonic vibrations in both of said edges whereby a weld will be formed at the edges without the formation of a substantial bead.

20. The method for continuously seam welding a tube or the like which comprises forming flat metal strip into a tubular shape having an open seam therein, and welding said edges together while simultaneously inducing ultrasonic vibrations in said tube in close proximity to the welding area whereby a weld will be formed at the seam without the formation of a substantial bead.

References Cited by the Examiner

UNITED STATES PATENTS

| 2,796,508 | 6/57 | Holman et al. | 113—131 X |
| 2,985,954 | 5/61 | Jones et al. | 29—470 |
| 3,101,404 | 8/63 | Hill | 219—128 |

FOREIGN PATENTS

| 215,374 | 6/58 | Australia. |
| 251,946 | 11/47 | Switzerland. |

JOHN F. CAMPBELL, *Primary Examiner.*

NEDWIN BERGER, WHITMORE A. WILTZ,
*Examiners.*